US009623385B2

(12) United States Patent
Krause et al.

(10) Patent No.: US 9,623,385 B2
(45) Date of Patent: Apr. 18, 2017

(54) CHEMICAL METERING SYSTEM

(71) Applicant: Cleaning Systems, Inc., DePere, WI (US)

(72) Inventors: David R. Krause, DePere, WI (US); Kenneth R. Smith, DePere, WI (US); Vladimir Chernin, DePere, WI (US)

(73) Assignee: Cleaning Systems, Inc., DePere, WI (US)

( * ) Notice: Subject to any disclaimer, the term of this patent is extended or adjusted under 35 U.S.C. 154(b) by 0 days.

(21) Appl. No.: 14/933,314

(22) Filed: Nov. 5, 2015

(65) Prior Publication Data
US 2016/0054157 A1    Feb. 25, 2016

(51) Int. Cl.
*F16L 15/00*    (2006.01)
*B01F 3/08*     (2006.01)
*B01F 5/04*     (2006.01)
*B01F 15/00*    (2006.01)
*F16L 41/03*    (2006.01)

(52) U.S. Cl.
CPC .......... *B01F 3/0865* (2013.01); *B01F 5/0428* (2013.01); *B01F 15/00922* (2013.01); *F16L 15/00* (2013.01); *F16L 41/03* (2013.01)

(58) Field of Classification Search
CPC .................................. G01F 1/00; G05D 7/00
USPC .......................................... 239/310, 413, 312
See application file for complete search history.

(56) References Cited

U.S. PATENT DOCUMENTS

| | | | | | |
|---|---|---|---|---|---|
| 266,530 | A | * | 10/1882 | Rosenfield | ................ A61L 9/03 137/268 |
| 1,664,046 | A | * | 3/1928 | Rosenberg | .............. E03C 1/046 239/310 |
| 1,968,075 | A | | 7/1934 | Ewald | |
| 2,135,969 | A | * | 11/1938 | Donaldson | .............. A47L 17/00 137/268 |
| 2,535,016 | A | | 12/1950 | Launder | |
| 2,599,678 | A | * | 6/1952 | Walker | ................. A01C 23/042 137/205.5 |
| 2,785,012 | A | * | 3/1957 | Frewin | ................. B01F 5/0496 137/268 |

(Continued)

OTHER PUBLICATIONS http://www.koflo.com/chemical-injection-quills.html; Chemical Injection Quills Webpage by Koflo Corporation; Received and Printed Oct. 16, 2015.

(Continued)

*Primary Examiner* — David E Bochna
(74) *Attorney, Agent, or Firm* — Neustel Law Offices; Michael S. Neustel (57) ABSTRACT

A chemical metering system for providing efficient access and replacement of chemical metering devices. The chemical metering system generally includes a chemical injector, a first tube fluidly connected to the chemical injector, a second tube adapted to be fluidly connected to a chemical supply, a releasable tube coupling removably and fluidly connected to the first tube and the second tube, and a metering device is adapted for controlling a flowrate of liquid chemical into the chemical injector from the chemical supply. The metering device is accessible for repair or replacement by removing the releasable tube coupling from either the first tube or the second tube for efficient access and replacement of the metering device.

24 Claims, 12 Drawing Sheets

(56) References Cited

U.S. PATENT DOCUMENTS

| | | | | |
|---|---|---|---|---|
| 2,919,073 A | * | 12/1959 | Akselrad | A47J 43/121 |
| | | | | 138/40 |
| 2,957,630 A | * | 10/1960 | Lamb | B05B 7/205 |
| | | | | 239/310 |
| 3,072,174 A | | 1/1963 | Vanderhoof | |
| 3,120,966 A | | 2/1964 | Lyon | |
| 3,335,671 A | * | 8/1967 | Schoenecker | B01J 4/008 |
| | | | | 239/304 |
| 3,773,169 A | | 11/1973 | Zahuranec | |
| 3,776,468 A | * | 12/1973 | Davenport | B05B 7/30 |
| | | | | 239/310 |
| 3,907,342 A | | 9/1975 | Dudek | |
| 4,029,260 A | * | 6/1977 | Herrick | B08B 3/02 |
| | | | | 134/100.1 |
| 4,247,531 A | * | 1/1981 | Hicks | C01B 11/024 |
| | | | | 210/754 |
| 4,891,877 A | | 1/1990 | Talavera | |
| 5,133,498 A | * | 7/1992 | Sealy | B05B 7/30 |
| | | | | 137/217 |
| 5,427,151 A | * | 6/1995 | Pauley | B01F 5/0077 |
| | | | | 137/505.25 |
| 5,558,375 A | | 9/1996 | Newman | |
| 5,626,291 A | * | 5/1997 | Flinn | B01F 5/0413 |
| | | | | 239/310 |
| 5,816,446 A | * | 10/1998 | Steindorf | B01F 3/0861 |
| | | | | 137/891 |
| 5,871,241 A | | 2/1999 | Van Essen | |
| 6,116,521 A | * | 9/2000 | Miyake | A01C 23/042 |
| | | | | 239/310 |
| 6,386,293 B1 | * | 5/2002 | Bartlett | A62C 5/02 |
| | | | | 169/13 |
| 6,877,778 B2 | | 4/2005 | Froment | |
| 6,896,203 B1 | * | 5/2005 | Restive | B05B 7/1254 |
| | | | | 239/302 |
| 7,021,669 B1 | | 4/2006 | Lindermeir | |
| 2002/0117853 A1 | | 8/2002 | Bartholomew | |
| 2005/0274822 A1 | * | 12/2005 | Lyons | B05B 1/1627 |
| | | | | 239/310 |

OTHER PUBLICATIONS http://car-wash.kleen-ritecorp.com/wash/Chemical-Metering-Tips; Chemical Metering Tips Webpage by Kleen-Rite Corp.; Received and Printed Oct. 16, 2015.
bluemulecleaning.com/options-accessories/metering-tips-color-coded-set-20; ColorCoded Metering Tips Webpage by Blue Mule Professional Cleaning Systems; Rcvd & Printed Oct. 16, 2015.
https://www.dultmeier.com/products/0.737.2720/1031; Chemical Injectors Webpage by Dultmeier Sales; Received and Printed Oct. 16, 2015.
www.johnguest.com/wp-content/uploads/2015/01/Plumbing-DIY-Installation-Manual-Z2105-301-0315WEB.pdf ; JG Speedfit Installation Manual by John Guest; Rcv'd and Printed Oct. 19, 2015.
http://www.johnguest.com/wp-content/uploads/2015/01/10mm-28mm-Plumbing-Literature-Z2105-369-0315WEB.pdf; UK Trade Guide by John Guest; Received and Printed Oct. 19, 2015.
http://www.johnguest.com/wp-content/uploads/2015/01/Drinks-Brochure-Z2105-87-0215WEB.pdf; Drink Dispenser and Pure Water Brochure by John Guest; Received and Printed Oct. 19, 2015.

* cited by examiner

CHEMICAL METERING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to a chemical metering system and more specifically it relates to a chemical metering system for providing efficient access and replacement of chemical metering devices.

Description of the Related Art

Any discussion of the related art throughout the specification should in no way be considered as an admission that such related art is widely known or forms part of common general knowledge in the field.

Chemical metering devices are used to control the flowrate of a chemical into another flow of liquid. The chemical metering devices are fluidly connected to a tube that is fluidly connected to a chemical injector (e.g. venturi injector) to introduce the liquid chemical into a water stream (or other chemical stream) at a specified flowrate. Various types of chemical metering devices have been used over the years including, but not limited to, metering tips, stinger tubes, and the like.

Conventional metering tips are often times threadably connected to the hose barb with internal threads of the chemical injector. If the metering tip needs to be replaced (e.g. metering tip is damaged or a different chemical flowrate is desired), the user must first remove the chemical supply tube from the hose barb of the injector, then threadably remove the old metering tip, threadably attach the new metering tip and then reattach the chemical supply tube to the hose barb. Stinger tubes are similar to metering tips in that they are threadably connected to a tube with the length of the metering tube cut to a desired length to achieve a desired flowrate and with the metering tube positioned inside the chemical supply tube.

One problem with conventional chemical metering tip systems is that removing the chemical supply tube from the hose bar of the chemical injector can be difficult particularly as the chemical supply tube ages and becomes rigid. In some situations, the user is required to cut the chemical supply tube to remove it from the hose barb. Another problem with conventional metering tip systems is that the chemical supply tube eventually becomes damaged after repeated removal and eventually leaks requiring replacement or repair of the chemical supply tube.

Because of the inherent problems with the related art, there is a need for a new and improved chemical metering system for providing efficient access and replacement of chemical metering devices.

BRIEF SUMMARY OF THE INVENTION

Provided herein is a chemical metering system which includes a chemical injector, a first tube fluidly connected to the chemical injector, a second tube adapted to be fluidly connected to a chemical supply, a releasable tube coupling removably and fluidly connected to the first tube and the second tube, and a metering device is adapted for controlling a flowrate of liquid chemical into the chemical injector from the chemical supply. The metering device is accessible for repair or replacement by removing the releasable tube coupling from either the first tube or the second tube for efficient access and replacement of the metering device.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 9b illustrate a chemical metering system 10, which comprises a chemical injector 20, a first tube 30 fluidly connected to the chemical injector 20, a second tube 60 adapted to be fluidly connected to a chemical supply, a releasable tube coupling 50 removably and fluidly connected to the first tube 30 and the second tube 60, and a metering device 40 is adapted for controlling a flowrate of liquid chemical into the chemical injector 20 from the chemical supply. The metering device 40 is accessible for repair or replacement by removing the releasable tube coupling 50 from either the first tube 30 or the second tube 60 for efficiently access and replacement of the metering device 40.

B. Chemical Injector

FIGS. 1 through 9b illustrate an exemplary chemical injector 20 having an inlet connector 22 and an outlet connector 24. The inlet connector 22 is adapted to be fluidly connected to an inlet tube 12 and the outlet connector 24 is adapted to be fluidly connected to an outlet tube 14. The inlet tube 12 delivers a pressurized main liquid such as water to be mixed with a chemical from a chemical supply (e.g. chemical tank, pressurized chemical source). The inlet tube 12 and the outlet tube 14 may be fluidly connected to the chemical injector 20 using fittings or other structures.

Figure 1:
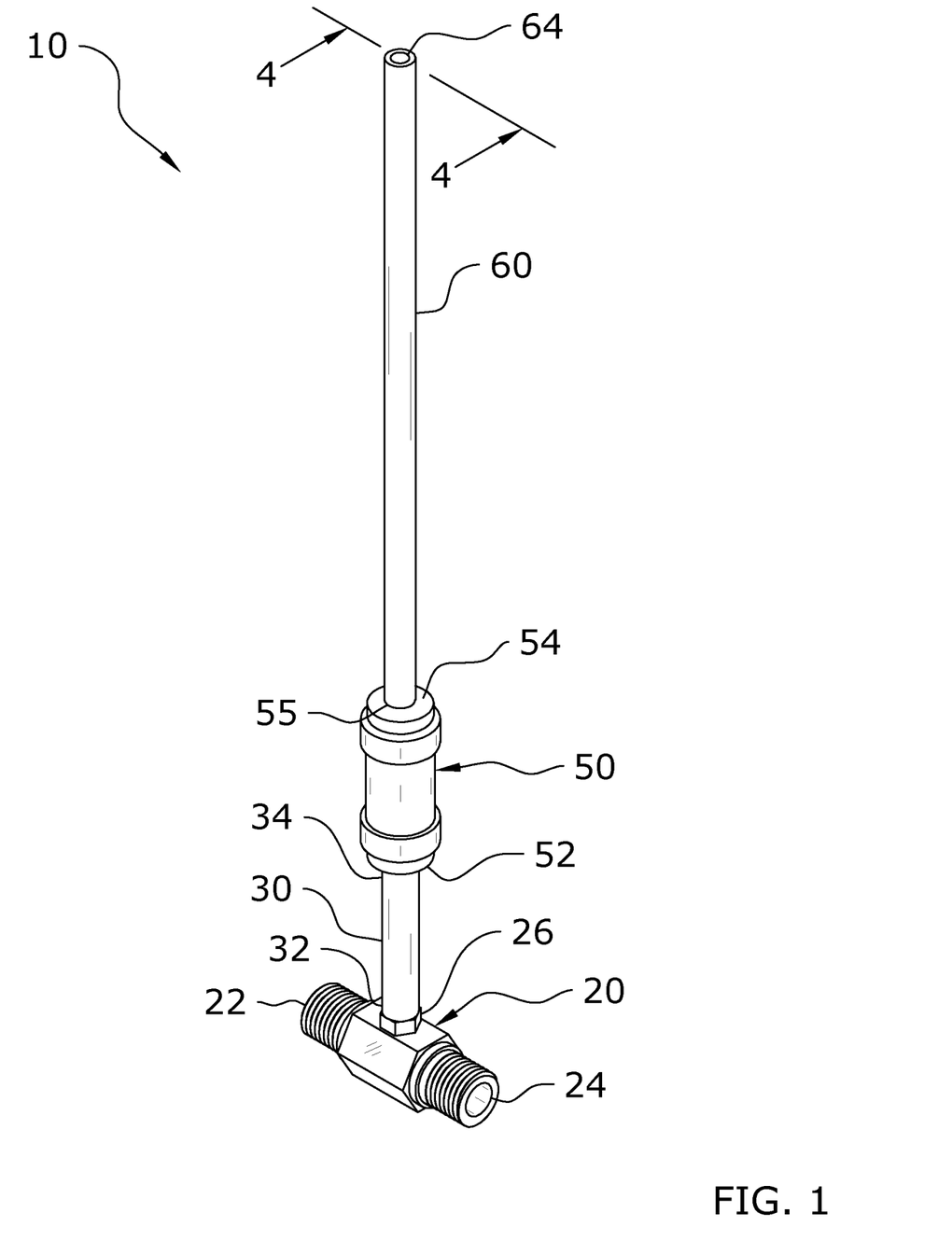
FIG. 1 is an upper perspective view of a first embodiment of the present invention.
Figure 2:
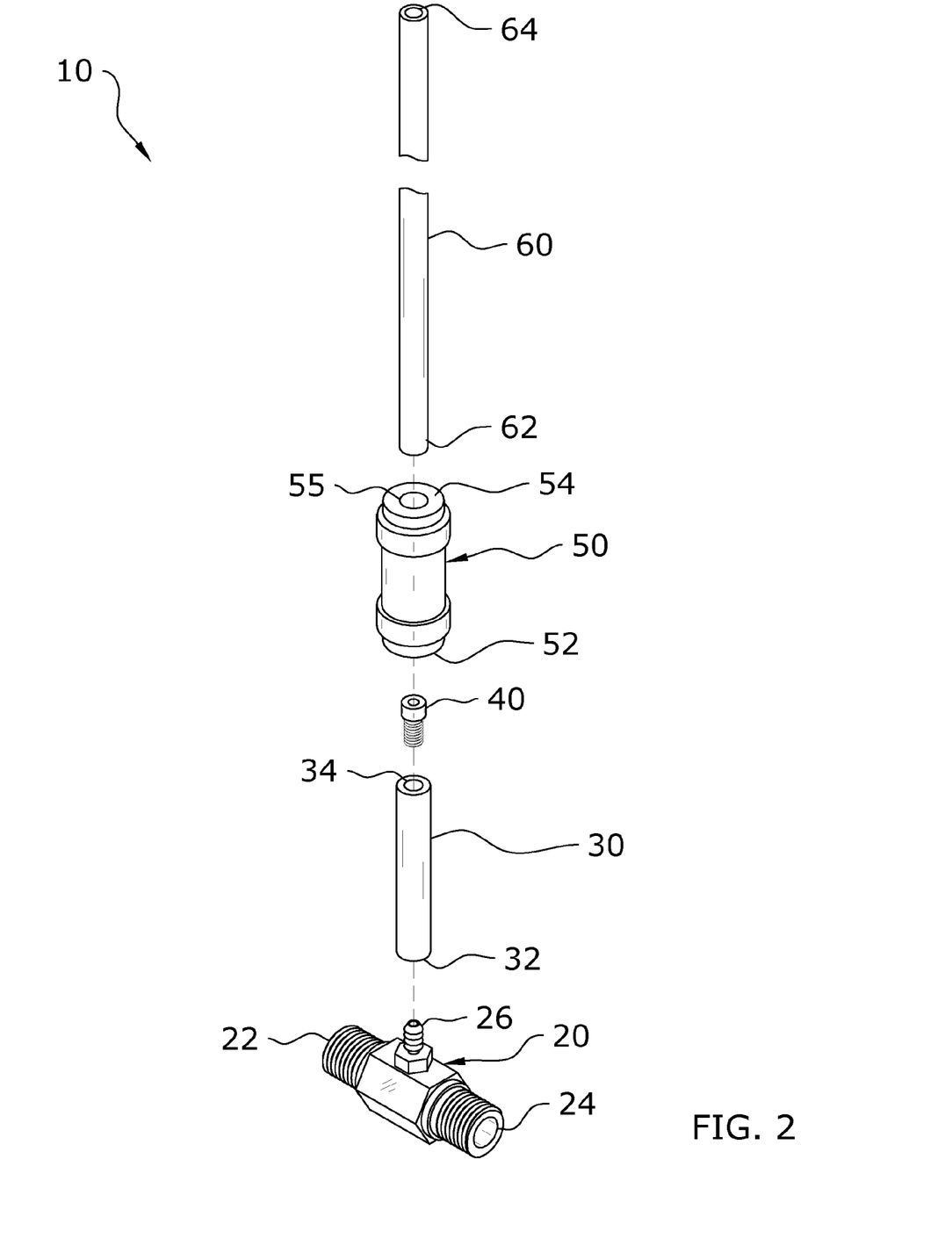
FIG. 2 is an exploded upper perspective view of the first embodiment of present invention showing the metering device connected to the connector tube.
Figure 3:
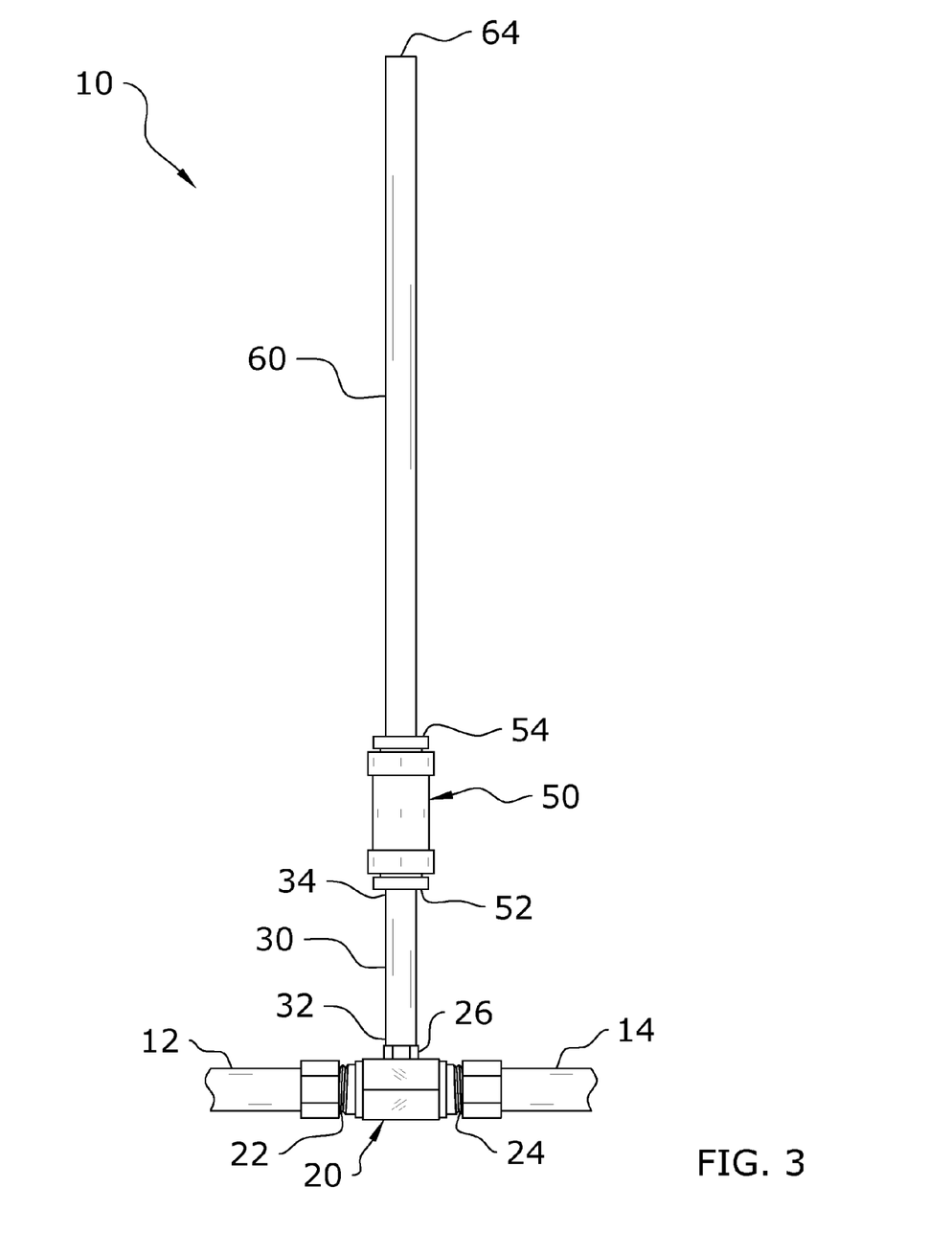
FIG. 3 is a side view of the present invention.
Figure 4:
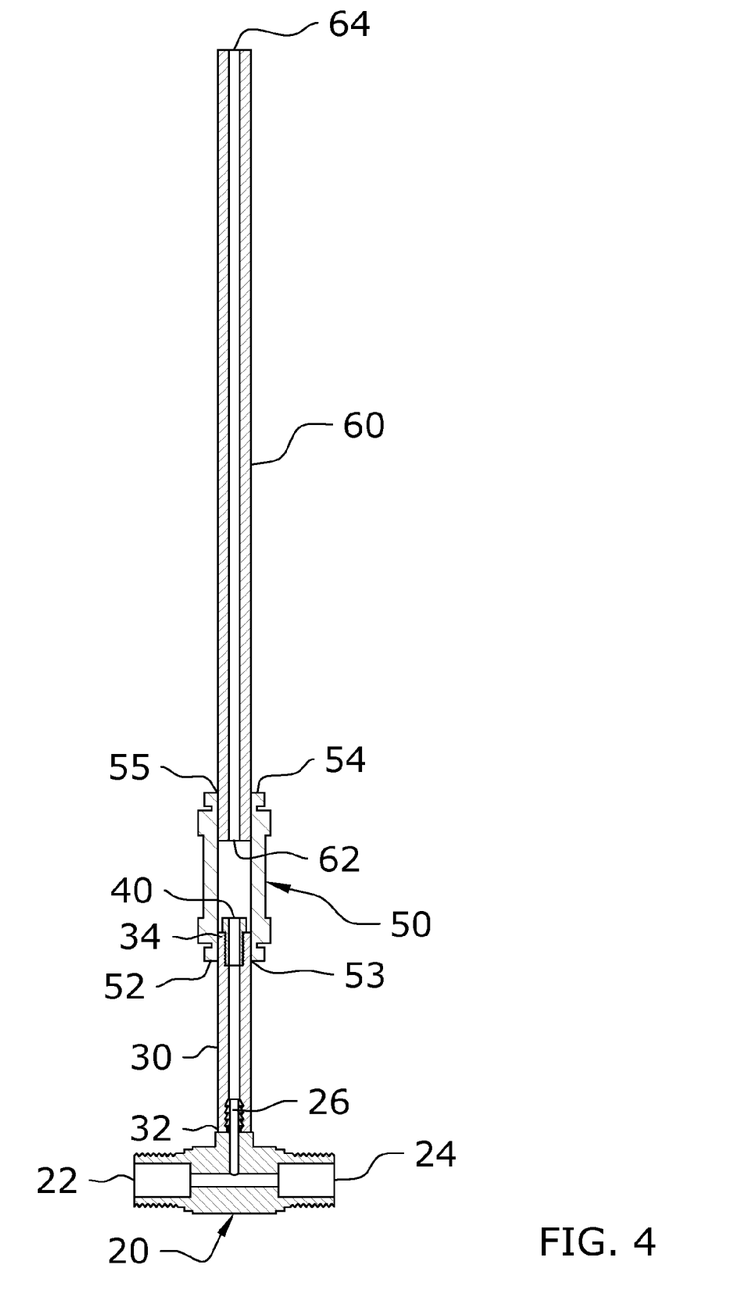
FIG. 4 is a cross sectional view taken along line 4-4 of FIG. 1.
Figure 5:
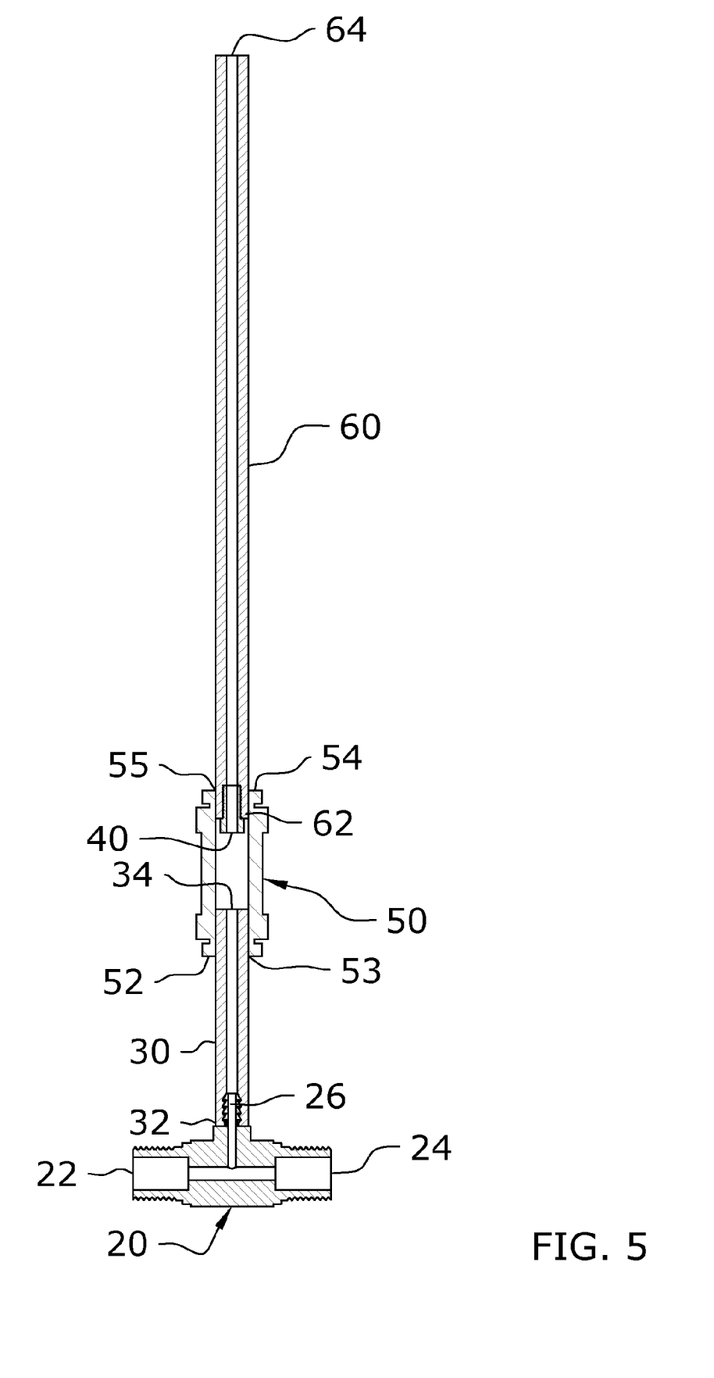
FIG. 5 is a cross sectional view of a second embodiment of the present invention with the metering device connected to the chemical supply tube.
Figure 6A:
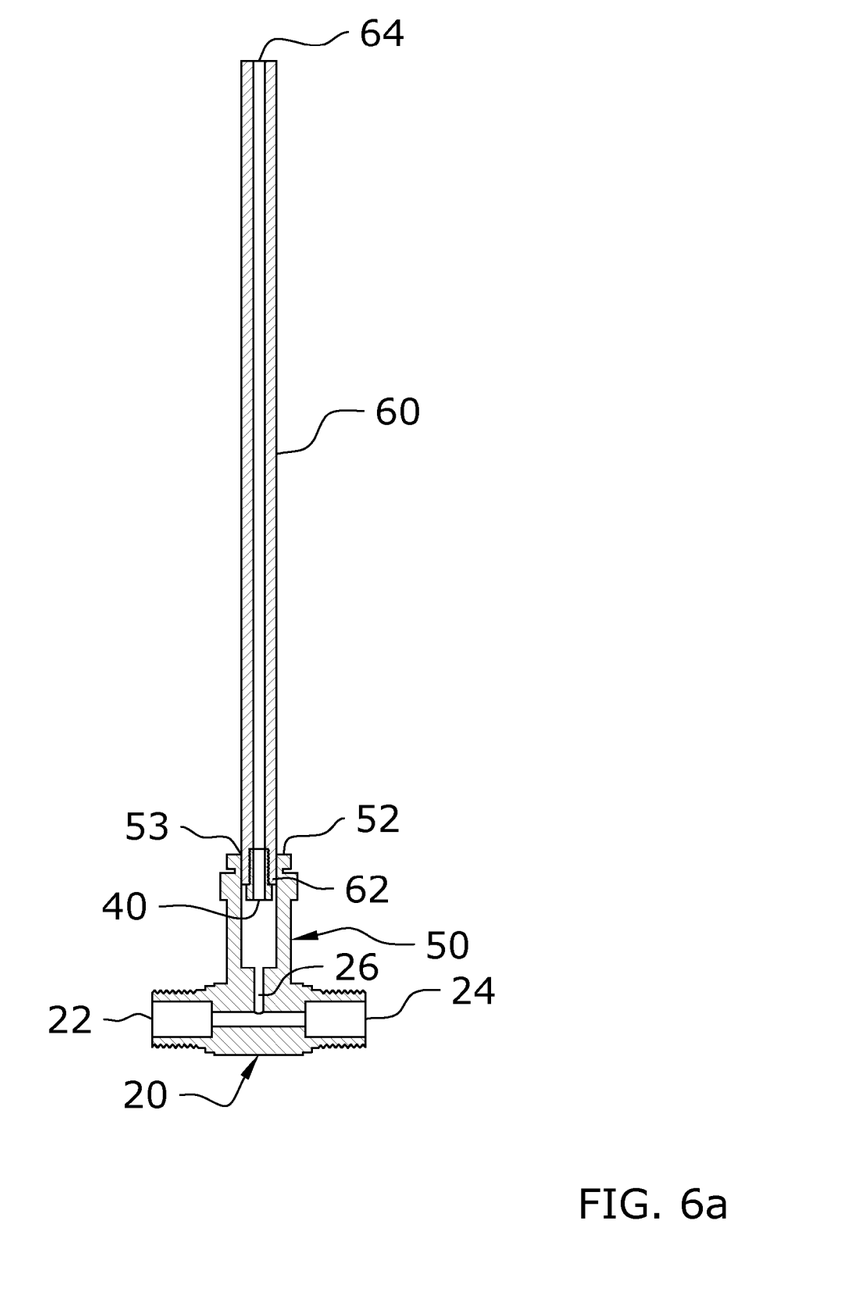
FIG. 6a is a cross sectional view of a third embodiment illustrating a chemical injector having the coupler connected to the chemical injector without a connector tube.
Figure 6B:
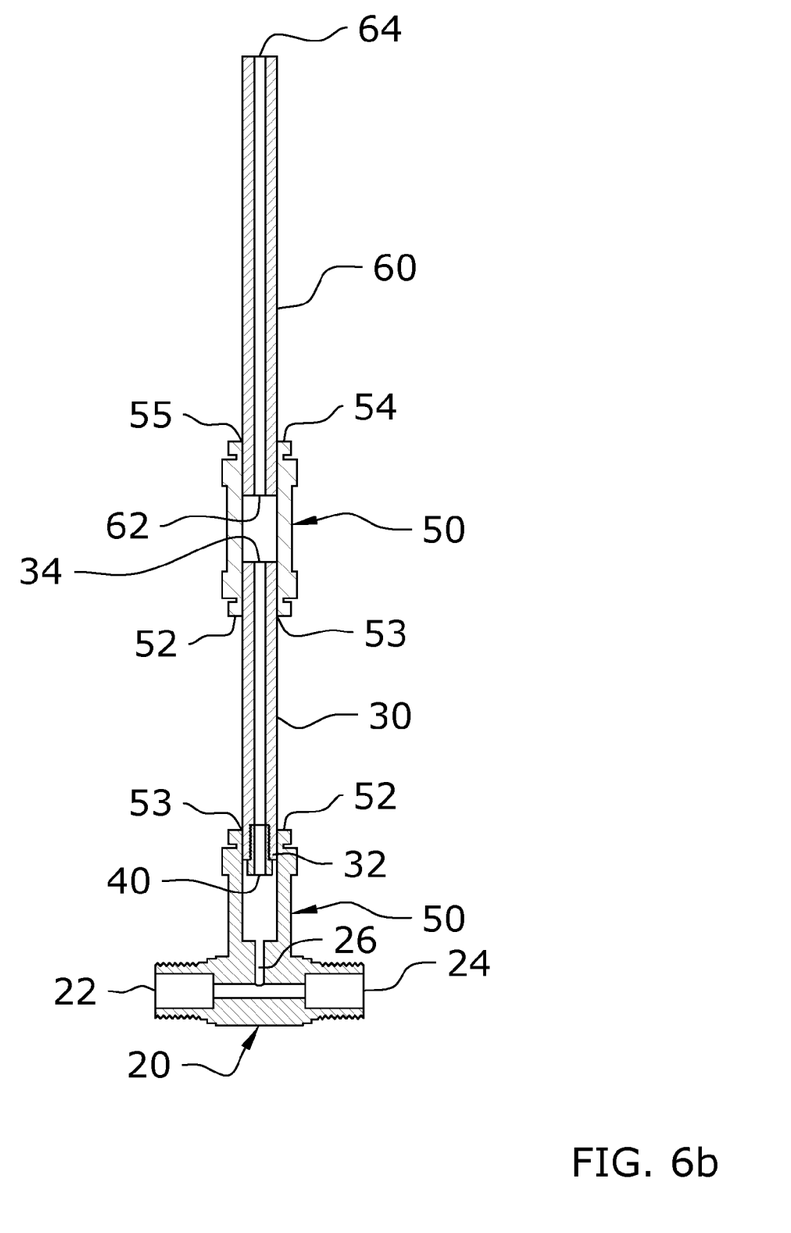
FIG. 6b is a cross sectional view of a fourth embodiment illustrating a chemical injector having the coupler connected to the chemical injector using a connector tube and a second coupler.
Figure 7:
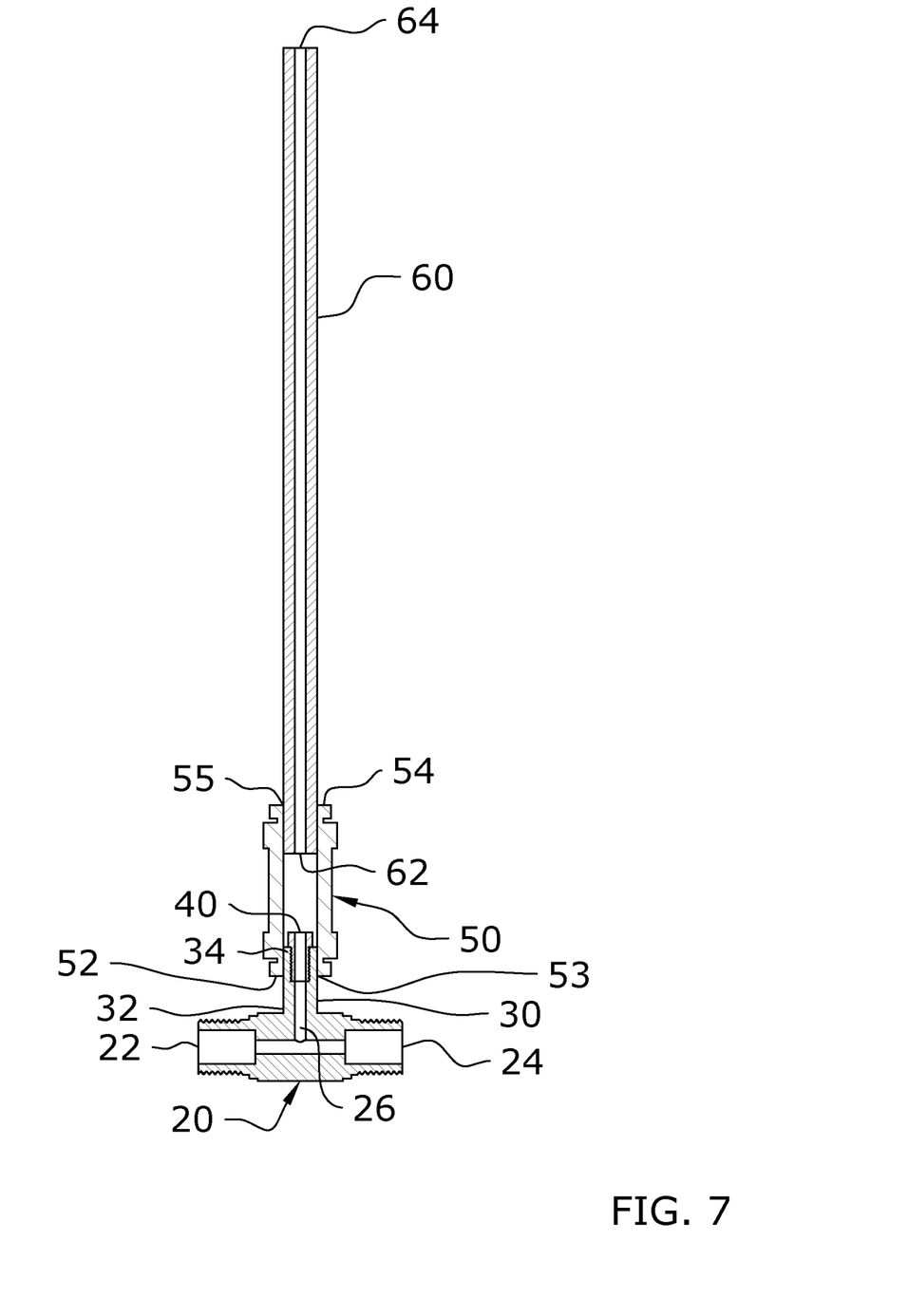
FIG. 7 is a cross sectional view of a fifth embodiment with the coupler removably connected to the chemical tube connector of the chemical injector.
Figure 9A:
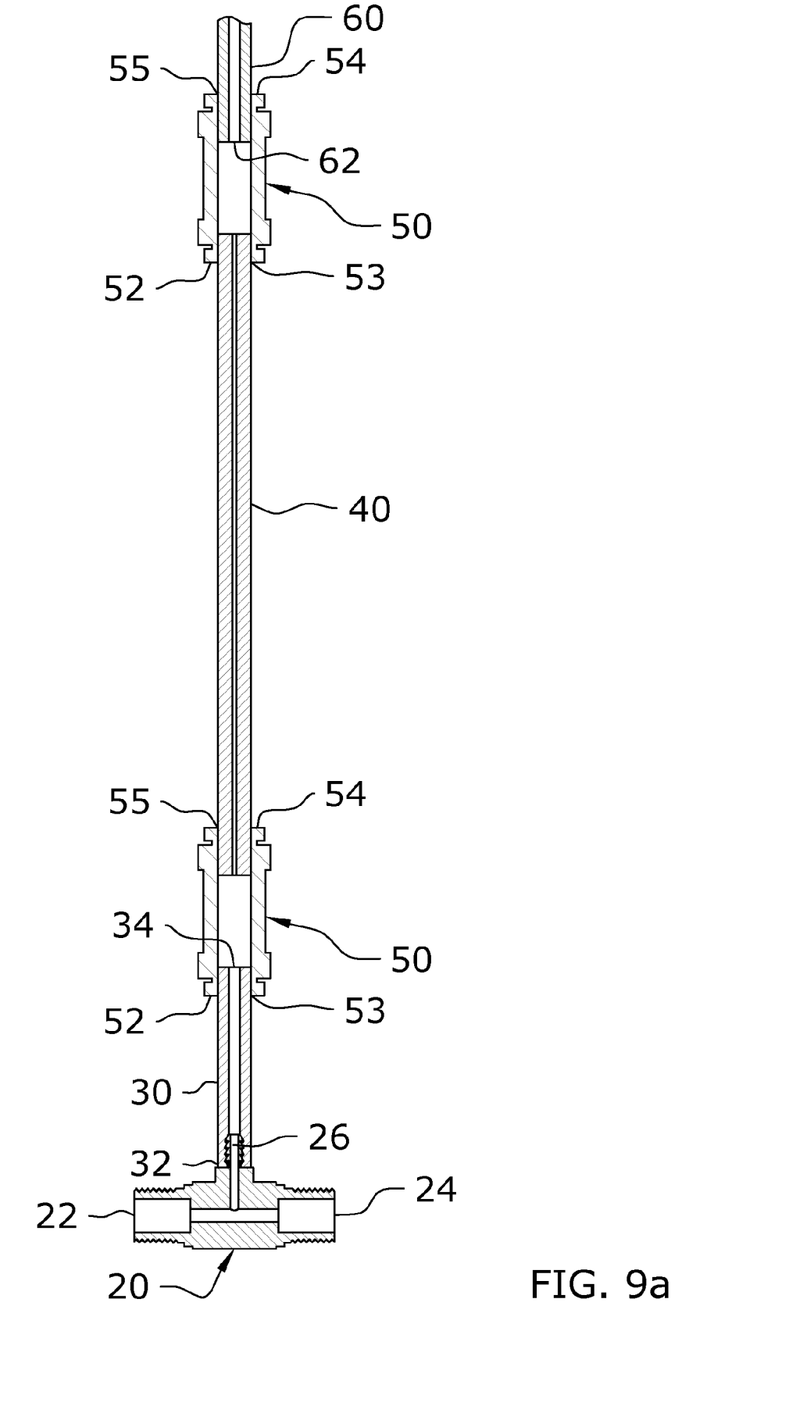
FIG. 9a is a cross sectional view of an eighth embodiment illustrating a metering tube being fluidly connected between two couplers.
Figure 9B:
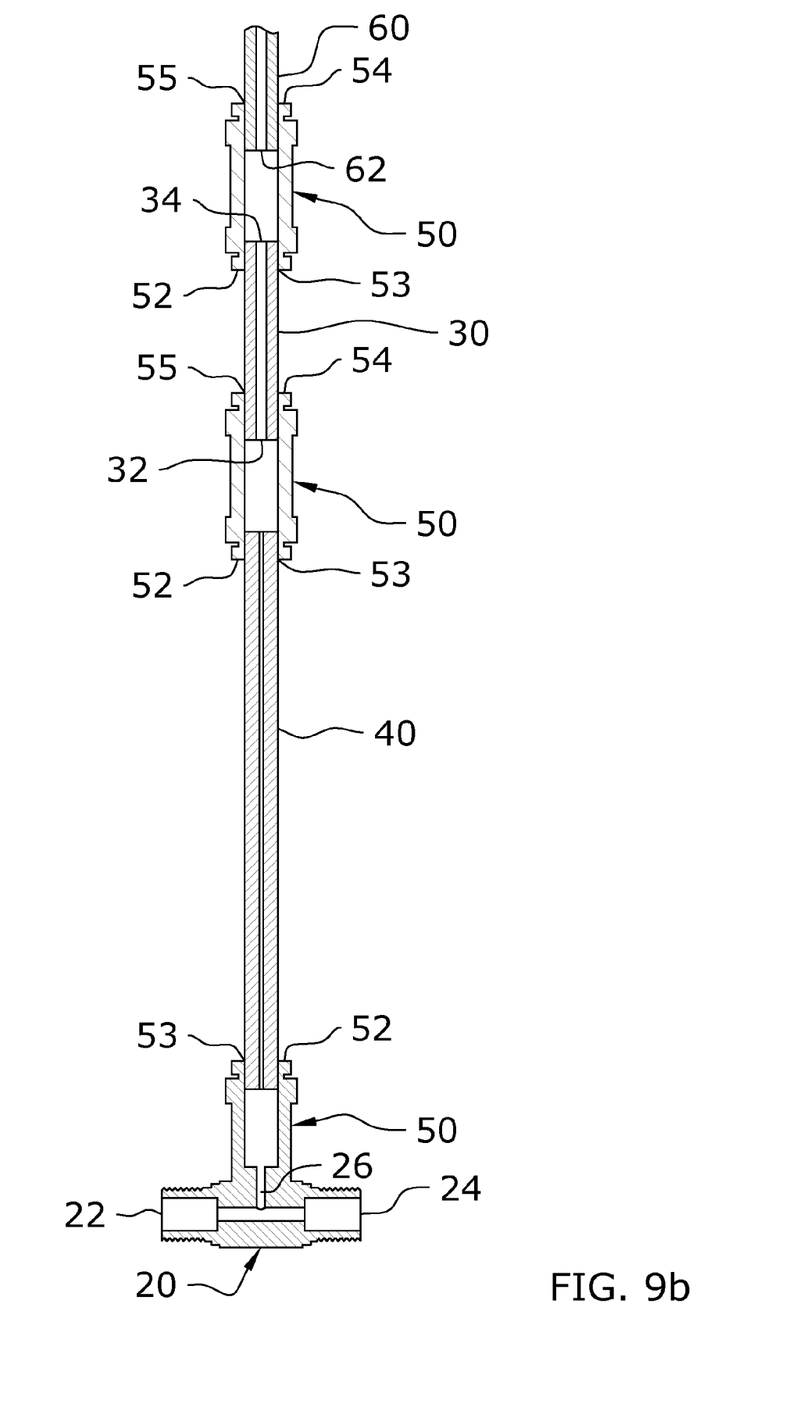
FIG. 9b is a cross sectional view of a ninth embodiment illustrating a metering tube being fluidly connected between the chemical injector and the coupler.

The chemical injector 20 may include a barbed tube connector 26 for removably connecting to the first end 32 of the first tube 30 as shown in FIGS. 2, 4 and 5 of the drawings. The chemical injector 20 may also include a releasable tube coupling 50 for removably connecting to the first tube 30 as shown in FIGS. 6a, 6b and 9b of the drawings.

The chemical to be mixed with the main liquid is preferably comprised of a liquid chemical and the chemical may be various types of chemicals used in carwashes (e.g. cleaning liquids, polishing liquids, protectants, conditioners, wax and the like) or other industries. The chemical injector 20 illustrated is comprised of a venturi injector but the chemical injector 20 may be comprised of various other types of chemical injectors 20.

C. First Tube

The first tube 30 has a first end 32 and a second end 34. The first end 32 of the first tube 30 is fluidly connected to the chemical injector 20 as illustrated in FIGS. 1 through 9a of the drawings. The first tube 30 may be removably or permanently connected to the chemical injector 20. The first tube 30 may be integrally formed as part of the chemical injector 20 to inject the liquid chemical into the chemical injector 20 for mixing at a desired ratio with the main liquid (e.g. water).

The first tube 30 may have various lengths depending upon the application. For example, the first tube 30 may be only 0.5 inches in length or the first tube 30 may have 9 inches or more in length. The outer diameter and the inner diameter of the first tube 30 may also vary depending upon the flowrate of liquid chemical and the liquid chemical involved. The first tube 30 may be comprised of various types of materials including, but not limited to, plastic or metal. The first tube 30 is preferably flexible but may be constructed of a non-flexible material.

D. Second Tube

The second tube 60 has a first end 62 and a second end 64 as shown in FIGS. 1 through 9b of the drawings. The second end 64 of the second tube 60 is adapted to be fluidly connected to a chemical supply either directly or indirectly to receive a flow of liquid chemical from the chemical supply.

The second tube 60 may have various lengths depending upon the application. For example and similar to the first tube 30, the second tube 60 may be only 0.5 inches in length or the second tube 60 may have 9 inches or more in length. The outer diameter and the inner diameter of the second tube 60 may also vary depending upon the flowrate of liquid chemical and the liquid chemical involved. The second tube 60 may be comprised of various types of materials including, but not limited to, plastic or metal. The second tube 60 is preferably flexible but may be constructed of a non-flexible material. The second tube 60 also may have different physical characteristics compared to the first tube 30 such as, but not limited to, different outer diameters, inner diameters, lengths, material type and the like.

E. Metering Device

Figure 8A:
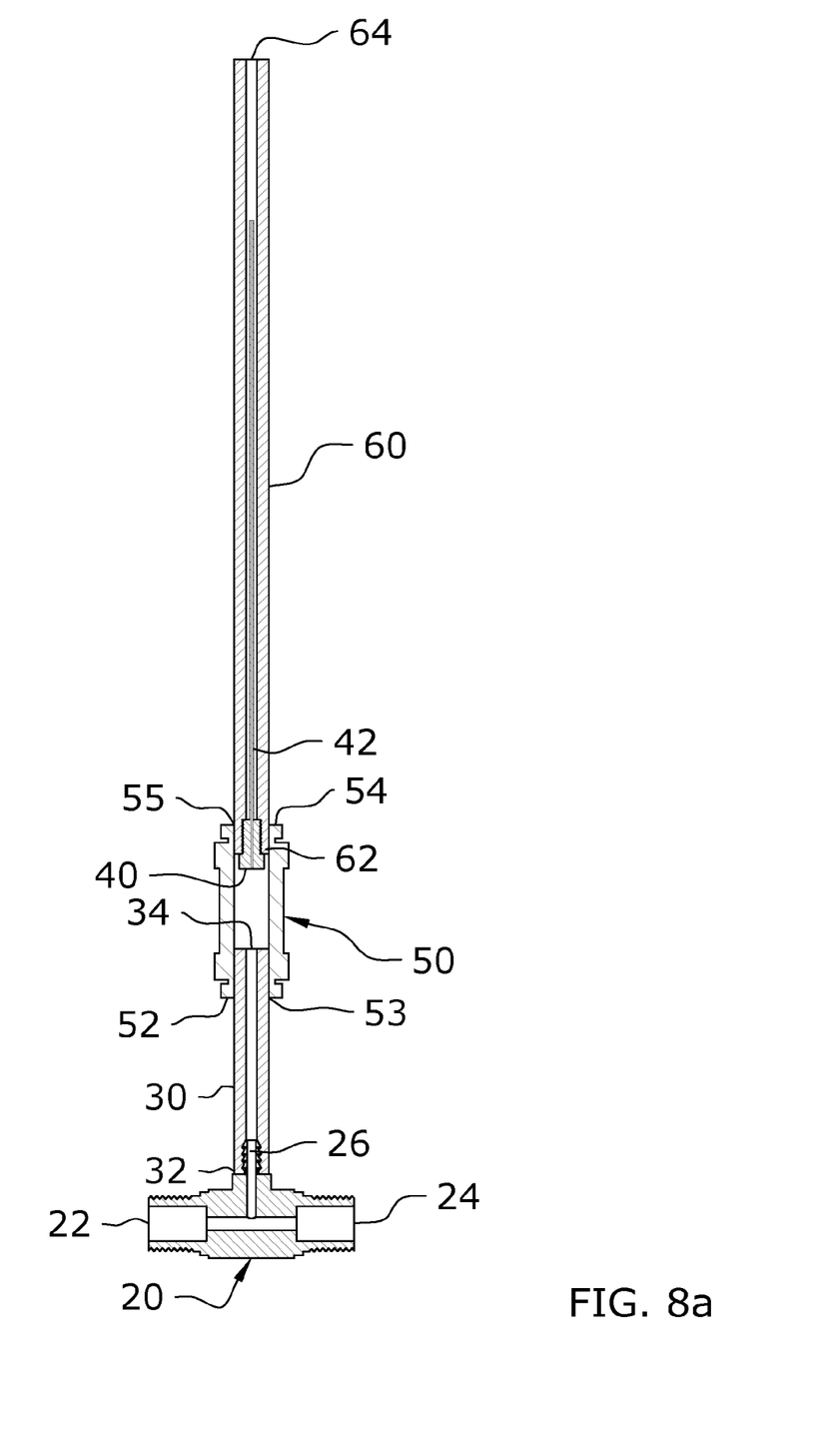
FIG. 8a is a cross sectional view of a sixth embodiment illustrating the usage of a stinger tube in the present invention connected to the chemical supply tube.
Figure 8B:
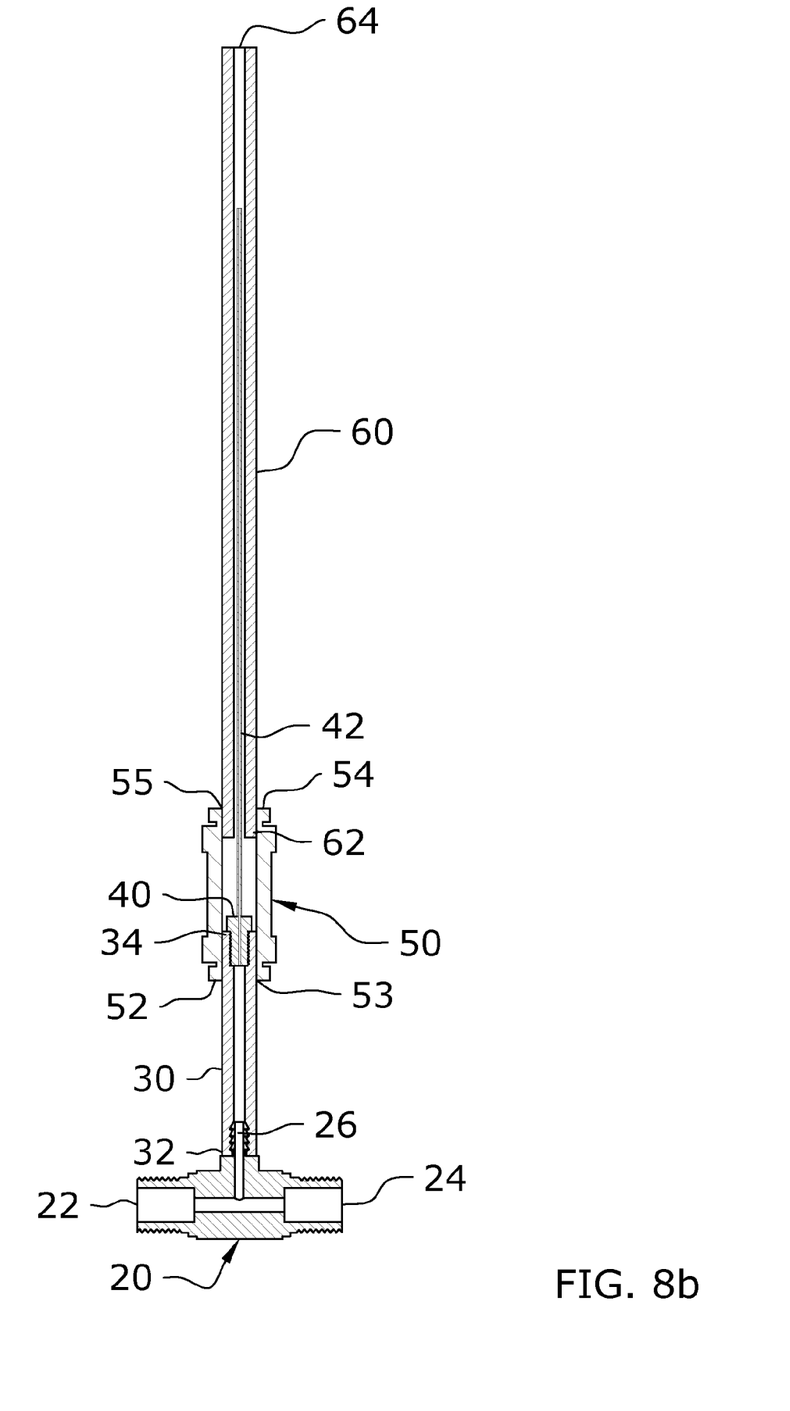
FIG. 8b is a cross sectional view of a seventh embodiment illustrating the usage of a stinger tube in the present invention connected to the connector tube with the metering tube portion extending through the chemical supply tube.

A metering device 40 is preferably physically and fluidly positioned between the first end 62 of the second tube 60 and the second end 34 of the first tube 30. The metering device 40 is adapted for controlling the flowrate of liquid chemical into the chemical injector 20 from the chemical supply. The metering device 40 may be attached to the second end 34 of the first tube 30 as shown in FIGS. 2, 4, 6b, 7, 8b or to the first end 62 of the second tube 60 as shown in FIGS. 5, 6a, 8a.

The metering device 40 is preferably comprised of a metering tip as shown in FIGS. 2, 4 through 7 of the drawings. The metering tip is preferably threadably connected to the second end 34 of the first tube 30 or the first end 62 of the second tube 60 as illustrated in the drawings. Alternatively, the metering device 40 may be comprised of various other metering structures capable of controlling the flowrate of chemical into the chemical injector 20 such as "stinger tubes" using a metering device 40 attached to the tube 30, 60 with an elongated metering tube 42 extending through at least a portion of the interior of the tube 30, 60 wherein the length and inner diameter of the metering tube 42 controls the flowrate of the liquid chemical.

F. Releasable Tube Coupling

The present invention uses a releasable tube coupling 50 having a first end 52 and a second end 54 opposite of the first end 52 to removably connect the second end 34 of the first tube 30 to the first end 62 of the second tube 60 as illustrated in FIGS. 1 through 5 of the drawings. The first end 52 of the releasable tube coupling 50 includes a first opening 53 that removably receives the second end 34 of the first tube 30 as illustrated in FIGS. 4 and 5. The second end 54 of the releasable tube coupling 50 includes a second opening 55 that removably receives the first end 62 of the second tube 60 as further illustrated in FIGS. 4 and 5 of the drawings.

While the releasable tube coupling 50 is illustrated as having two female connector ends, the releasable tube coupling 50 may be attached to any tube that does not require easy removal thereof with conventional fittings (e.g. barbed connector, threaded fitting) and only has one female connector end for removably receiving the tube in a quick-release manner. In addition, more than one releasable tube coupling 50 may be used in the chemical line as illustrated in FIGS. 6b, 9a and 9b. Various other configurations may be used wherein the significant portion of the invention is having at least one end of the releasable tube coupling 50 fully or at least partially surrounding a portion of the metering device 40 such that removal of the releasable tube coupling 50 from one of the tubes 30, 60 provides quick and easy access to the metering device 40 for removal and replacement of the metering device 40. If two opposing female coupling ends are used for the releasable tube coupling 50, the female coupling ends may have different diameters for first opening 53 and second opening 55 to accommodate tubes 30, 60 having different outer diameters (or the first opening 53 and the second opening 55 may have the same diameter).

The first end 52 of the releasable tube coupling 50 is removably and fluidly connected to the second end 34 of the first tube 30 and the second end 54 of the releasable tube coupling 50 is removably and fluidly connected to the first end 62 of the second tube 60. The releasable tube coupling 50 fluidly connects the first tube 30 and the second tube 60 in a releasable manner to allow for easy removal of the releasable tube coupling 50 to provide convenient access and exchange of the metering device 40 such as a metering tip.

The releasable tube coupling 50 is preferably comprised of a compression fitting and further is preferably comprised of a releasable push-to-connect tube fitting sometimes referred to as a "quick disconnected coupling", "quick-release fitting", "push-in fitting" or "push in hose fitting". The opposing ends 52, 54 of the releasable tube coupling 50 are comprised of female ends with a collet that can be pushed in to release a connected tube.

Tube fittings of a manual "push-to-connect" type are widely employed in a variety of pneumatic, hydraulic, and other fluid transport applications utilizing plastic or metal tubing. These fittings have been adapted for use as connectors with many different tubing types including polyurethane (PU), polytetrafluoroethylene (PTFE), fluorinate ethylene polypropylene (FEP), perfluoroalkoxy resin (PFA), polyethylene (PE), polypropylene (PP), rigid and flexible nylon, acrylonitrile-butadiene-styrene (ABS) copolymer, copper, and brass.

The present invention preferably utilizes a straight releasable tube coupling 50 having a longitudinal axis and opposing ends 52, 54 concentrically aligned upon the longitudinal axis, however, various other types of releasable tube couplings 50 may be used (e.g. elbow type and the like). An expandable collet is slidably received within a gland of the open end of the body as extending between an external forward end and an internal rearward end which is formed of a plurality of circumferential, arcuate sections. Each of these resilient segments extend between a forward proximal end and a rearward distal end formed as having a radially outwardly facing shoulder of an enlarged outer diameter and a wedge-shaped, radially inwardly facing grip edge. These grip edges, in turn, are formed by the intersection of a forward and a rearward presenting inclined surface, the forward surface functioning as a camming surface effecting the radial outward expansion of the collet sections allowing for the insertion of a distal tubing end pushed through the collet from the open forward end of the body. A rearwardly-inclined ramp surface typically is operatively associated with the collet shoulders as integrally-formed within the internal surface of the body throughbore or gland at a position forward of the collet segment distal ends, or as separately provided as formed within the internal surface of a retaining ring interposed between the outer circumferential surface of the collet and the inner circumferential surface of the open forward end of the body. An O-ring or other seal member may be interposed between the rearward end of the collet and a forwardly presenting end wall of the body gland for effecting a fluid-tight engagement with the outer wall of the tubing and the inner wall of the body.

For assembly, as the tubing is inserted into the fitting, the distal end of the tubing first is passed through the grip edges of the collet, the segments of which expand to resiliently capture and hold the outer diameter of the tubing, and then through the O-ring which provides a leak-proof seal against the tubing outer wall. The advancement of the tubing into the open end of the fitting is continued until positively stopped by the forwardly presenting end wall of the body gland. Upon the pressurization of the tubing, or as the tubing is pulled or otherwise placed in tension by a generally forwardly directed axial force, the collet is moved slidably forwardly with the tubing. This movement is delimited, however, by the shoulders of the collet sections being made to abuttingly contact the ramp surface of the body in a force transmitting engagement applying a radially-inwardly directed force to the collet segments and the grip edges thereof. In this way, the grip of the collet thereby is energized to compressively tighten about the outer wall of the tubing preventing the removal of the tubing from the fitting.

For disassembly, the tubing may be released from the fitting by manually repositioning and holding the collet at its rearward-most axial position, typically with the forward end of the collet being abutted against the first end of the body. In such position, the collet segments are de-energized and again may be expanded to release the tubing. In this regard, the external rearward end of the collet may be configured as an annular collar which may be pushed axially inwardly for advancing the collet and tubing within the body. The measure between the rearward-most and the forward-most position of the collet is known to the art as the "collet rise" or "travel," and is the linear distance which the collet moves relative to the body. Generally, it is preferred to minimize this distance as extended collet travel increases the space necessary to install the fitting and otherwise is known to increase the potential for collet damage.

Representative releasable tube couplings 50 of the type herein involved are described in U.S. Pat. Nos. 3,653,689; 3,999,783; 4,005,883; 4,009,896; 4,059,295; 4,111,575; 4,178,023; 4,302,036; 4,335,908; 4,573,716; 4,600,223; 4,606,783; 4,637,636; 4,645,246; 4,650,529; 4,657,286; 4,722,560; 4,770,445; 4,804,213; 4,884,829; 4,923,220; 4,946,213; 5,046,763; 5,230,539; 5,303,963; 5,314,216; 5,330,235; 5,370,423; 5,401,064; 5,437,483; 5,439,258; 5,443,289; 5,468,027; 5,511,830; 5,607,193; 5,024,468; 5,683,120; 5,683,121; 4,685,706; and in U.S. Pub. No, 2004/0124635. All of these U.S. patents and published patent application are incorporated by reference herein for the purposes of disclosing suitable structures for usage as the releasable tube coupling 50. Commercial fittings of such type are marketed by various companies such as John Guest. Another fitting of the push-in type includes a grab ring formed of a plurality of resilient fingers for gripping the tubing, and a release sleeve which is slidably interposable between the fingers and the tubing outer wall for releasing the tubing from the fitting. Push-in fittings exemplary of this design include those marketed by the Brass Products Division of Parker-Hannifin Corp. under the name Prestolok, by Nycoil of Fanwood, N.J., under the name "Polymatic®," and by Pisco Products of Okaya City, Japan.

To control the disconnection of the tubing, a spring-type locking clip conventionally is employed. One such clip, shown in commonly-assigned U.S. Pat. No. 5,584,513, is of a resiliently expandable "horseshoe" or "omega" shape configured to be received over the collet as interposed between the external forward end thereof and the corresponding end of the fitting body. Typically, these clips are designed to be "wedged" between the collet and the fitting body such that the collet is urged to its energized, forwardmost position. Similarly functioning locking clips are shown in U.S. Pat. Nos. 4,005,883; 4,009,896; 4,059,295; 4,884,829; 5,330,235; and 5,437,483. Alternatively, locking covers are provided to prevent the collet from being accidentally or otherwise unintentionally moved to its rearward-most, de-energized position. As is shown, for example, in U.S. Pat. No. 4,573,716, such caps include cylindrical side walls that extend over the collet into a mechanical or other engagement with the fitting body, and an end wall having a central aperture through which tubing is allowed to pass. Other representative covers of like construction are shown in U.S. Pat. Nos. 4,573,716; 4,923,220; 5,046,763; and 5,468,027, and in UK Patent No. 1,602,077.

G. Alternative Embodiment

Coupling Permanently Connected to Injector

FIGS. 6a and 6b illustrate an alternative embodiment where the releasable tube coupling 50 is permanently (e.g. permanently attached, integrally formed and the like) attached to the chemical injector 20 and only has one female coupling end to removably connect the first tube 30 or the second tube 60. The end of the first tube 30 or second tube 60 that includes the metering device 40 is removably connected to the first end 52 of the releasable tube coupling 50 as shown in FIGS. 6a and 6b of the drawings.

H. Alternative Embodiment

Metering Tube

FIGS. 9a through 9b illustrate a metering device 40 comprised of a metering tube 42 fluidly and removably connected between a first releasable tube coupling 50 and a second releasable tube coupling 50. The metering tube 42 has a predetermined length and a predetermined inner diameter size for controlling a flowrate of liquid chemical into the chemical injector 20 from a chemical supply. For example, the longer the length of the metering tube 42 (e.g. 9 inches) the more resistance will be provided to the liquid chemical and therefore a reduced flowrate will be achieved compared to a shorter length of metering tube 42 (e.g. 3 inches). In addition, the smaller the inner diameter of the metering tube 42 (e.g. 0.2 mm) the more resistance will be provided to the liquid chemical and therefore a corresponding reduced flowrate will be achieved compared to a larger inner diameter (e.g. 0.4 mm). The combination of the length and the inner diameter for the metering tube 42 determines the flowrate of the liquid chemical based on the pressure applied to the liquid chemical. The viscosity and other factors also contribute to the flowrate produced by the metering tube 42. To replace the metering tube 42 in FIGS. 9a and 9b, the user must remove the releasable tube couplings 50 on both ends of the metering tube 42 and then position a new metering tube 42 into the respective ends of the releasable tube couplings 50.

I. Operation of Preferred Embodiment

In use, the chemical injector 20 is fluidly connected to the inlet tube 12 to receive a main liquid to be mixed with the chemical. As the main liquid (e.g. water) flows into the chemical injector 20, the liquid chemical is drawn into the chemical injector 20 via the venturi effect (or other chemical injecting process) wherein the metering device 40 controls the flowrate of the liquid chemical into the chemical injector 20. The controlled flowrate of the liquid chemical allows for mixing of the chemical with the main liquid at precise ratios. The chemical injector 20 combines and mixes the liquid chemical with the main liquid and the mixture is then discharged out through the outlet tube 14 where the mixture is dispensed into a carwash or other application.

Over time, the metering device 40 may need to be replaced because it has become damaged, clogged or requires replacement to change the flowrate of the liquid chemical using a different type of metering device 40. To replace the metering device 40, the user simply presses inwardly upon the collet of the releasable tube coupling 50 that is positioned about the metering device 40 to remove the corresponding tube 30, 60. For example, in FIG. 4, the user would press inwardly upon the collet of the first end 52 resulting in the release of the releasable tube coupling 50 from the first tube 30 and exposing the metering device 40 (a metering tip) connected to the second end 34 of the first tube 30. The user is then able to remove the old metering tip and replace it with a new metering tip of the same or different chemical flowrate. The new metering tip is threadably attached to the second end 34 of the first tube 30 and then the user pushes the second end 34 of the first tube 30 into the first opening 53 of the first end 52 of the releasable tube coupling 50 thereby fluidly connecting the first tube 30 to the releasable tube coupling 50 in a sealed manner. This process may be repeated numerous times without damage to the tubes 30, 60 or requiring cutting of the tubes 30, 60. A similar process is used for the alternative embodiments.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:
1. A chemical metering system, comprising:
a chemical injector having an inlet connector and an outlet connector, wherein the inlet connector is adapted to be fluidly connected to an inlet tube and wherein the outlet connector is adapted to be fluidly connected to an outlet tube;
a first tube having a first end and a second end, wherein the first end of the first tube is fluidly connected to the chemical injector;
a second tube having a first end and a second end, wherein the second end of the second tube is adapted to be fluidly connected to a chemical supply;
a releasable tube coupling having a first end and a second end opposite of the first end, wherein the first end of the releasable tube coupling is removably and fluidly connected to the second end of the first tube, wherein the second end of the releasable tube coupling is removably and fluidly connected to the first end of the second tube, wherein the releasable tube coupling fluidly connects the first tube and the second tube, and wherein the releasable tube coupling is comprised of a releasable push-to-connect tube fitting; and
a metering device positioned between the first end of the second tube and the second end of the first tube, wherein the metering device is adapted for controlling a flowrate of liquid chemical into the chemical injector from the chemical supply.

2. The chemical metering system of claim 1, wherein the chemical injector is comprised of a venturi injector.

3. The chemical metering system of claim 1, wherein the releasable tube coupling is comprised of a compression fitting.

4. The chemical metering system of claim 1, wherein the metering device is attached to the second end of the first tube.

5. The chemical metering system of claim 1, wherein the metering device is attached to the first end of the second tube.

6. The chemical metering system of claim 1, wherein the metering device is comprised of a metering tip.

7. The chemical metering system of claim 6, wherein the metering tip is threadably connected to the second end of the first tube.

8. The chemical metering system of claim 6, wherein the metering tip is threadably connected to the first end of the second tube.

9. The chemical metering system of claim 1, wherein the metering device includes a metering tube extending through a portion of the second tube.

10. The chemical metering system of claim 1, wherein the first tube is permanently connected to the chemical injector.

11. The chemical metering system of claim 1, wherein the chemical injector includes a barbed tube connector and wherein the first end of the first tube is connected to the barbed tube connector.

12. The chemical metering system of claim 1, wherein the first tube and the second tube are comprised of plastic tubing.

13. The chemical metering system of claim 1, wherein the metering device is comprised of a metering tube.

14. The chemical metering system of claim 13, wherein the metering tube has a length and an inner diameter size for controlling a flowrate of liquid chemical into the chemical injector from a chemical supply.

15. A chemical metering system, comprising:
a chemical injector having an inlet connector and an outlet connector, wherein the inlet connector is adapted to be fluidly connected to an inlet tube and wherein the outlet connector is adapted to be fluidly connected to an outlet tube;
a first tube having a first end and a second end, wherein the second end of the first tube is adapted to be fluidly connected to a chemical supply;
a releasable tube coupling permanently and fluidly connected to the chemical injector, wherein a first end of the releasable tube coupling is removably and fluidly connected to the first end of the first tube, and wherein the releasable tube coupling is comprised of a releasable push-to-connect tube fitting; and
a metering device attached to the first end of the first tube, wherein the metering device is adapted for controlling a flowrate of liquid chemical into the chemical injector from the chemical supply.

16. The chemical metering system of claim 15, wherein the chemical injector is comprised of a venturi injector.

17. The chemical metering system of claim 15, wherein the releasable tube coupling is comprised of a compression fitting.

18. The chemical metering system of claim 15, wherein the metering device is comprised of a metering tip.

19. The chemical metering system of claim 18, wherein the metering tip is threadably connected to the first end of the first tube.

20. A chemical metering system, comprising:
a chemical injector having an inlet connector and an outlet connector, wherein the inlet connector is adapted to be fluidly connected to an inlet tube and wherein the outlet connector is adapted to be fluidly connected to an outlet tube;
a first tube having a first end and a second end, wherein the first end of the first tube is fluidly connected to the chemical injector;
a second tube having a first end and a second end, wherein the second end of the second tube is adapted to be fluidly connected to a chemical supply;
a releasable tube coupling having a first end and a second end opposite of the first end, wherein the first end of the releasable tube coupling is removably and fluidly connected to the second end of the first tube, wherein the second end of the releasable tube coupling is removably and fluidly connected to the first end of the second tube, and wherein the releasable tube coupling fluidly connects the first tube and the second tube; and
a metering device positioned between the first end of the second tube and the second end of the first tube, wherein the metering device is adapted for controlling a flowrate of liquid chemical into the chemical injector from the chemical supply, and wherein the metering device is comprised of a metering tip, wherein the metering tip is threadably connected to the second end of the first tube.

21. A chemical metering system, comprising:
a chemical injector having an inlet connector and an outlet connector, wherein the inlet connector is adapted to be fluidly connected to an inlet tube and wherein the outlet connector is adapted to be fluidly connected to an outlet tube;
a first tube having a first end and a second end, wherein the first end of the first tube is fluidly connected to the chemical injector;
a second tube having a first end and a second end, wherein the second end of the second tube is adapted to be fluidly connected to a chemical supply;
a releasable tube coupling having a first end and a second end opposite of the first end, wherein the first end of the releasable tube coupling is removably and fluidly connected to the second end of the first tube, wherein the second end of the releasable tube coupling is removably and fluidly connected to the first end of the second tube, and wherein the releasable tube coupling fluidly connects the first tube and the second tube; and a metering device positioned between the first end of the second tube and the second end of the first tube, wherein the metering device is adapted for controlling a flowrate of liquid chemical into the chemical injector from the chemical supply, and wherein the metering device is comprised of a metering tip, wherein the metering tip is threadably connected to the first end of the second tube.

22. A chemical metering system, comprising:

a chemical injector having an inlet connector and an outlet connector, wherein the inlet connector is adapted to be fluidly connected to an inlet tube and wherein the outlet connector is adapted to be fluidly connected to an outlet tube;

a first tube having a first end and a second end, wherein the first end of the first tube is fluidly connected to the chemical injector;

a second tube having a first end and a second end, wherein the second end of the second tube is adapted to be fluidly connected to a chemical supply;

a releasable tube coupling having a first end and a second end opposite of the first end, wherein the first end of the releasable tube coupling is removably and fluidly connected to the second end of the first tube, wherein the second end of the releasable tube coupling is removably and fluidly connected to the first end of the second tube, and wherein the releasable tube coupling fluidly connects the first tube and the second tube; and a metering device positioned between the first end of the second tube and the second end of the first tube, wherein the metering device is adapted for controlling a flowrate of liquid chemical into the chemical injector from the chemical supply, and wherein the metering device includes a metering tube extending through a portion of the second tube.

23. A chemical metering system, comprising:

a chemical injector having an inlet connector and an outlet connector, wherein the inlet connector is adapted to be fluidly connected to an inlet tube and wherein the outlet connector is adapted to be fluidly connected to an outlet tube;

a first tube having a first end and a second end, wherein the first end of the first tube is fluidly connected to the chemical injector;

wherein the chemical injector includes a barbed tube connector and wherein the first end of the first tube is connected to the barbed tube connector;

a second tube having a first end and a second end, wherein the second end of the second tube is adapted to be fluidly connected to a chemical supply;

a releasable tube coupling having a first end and a second end opposite of the first end, wherein the first end of the releasable tube coupling is removably and fluidly connected to the second end of the first tube, wherein the second end of the releasable tube coupling is removably and fluidly connected to the first end of the second tube, and wherein the releasable tube coupling fluidly connects the first tube and the second tube; and a metering device positioned between the first end of the second tube and the second end of the first tube, wherein the metering device is adapted for controlling a flowrate of liquid chemical into the chemical injector from the chemical supply.

24. A chemical metering system, comprising:

a chemical injector having an inlet connector and an outlet connector, wherein the inlet connector is adapted to be fluidly connected to an inlet tube and wherein the outlet connector is adapted to be fluidly connected to an outlet tube;

a first tube having a first end and a second end, wherein the second end of the first tube is adapted to be fluidly connected to a chemical supply;

a releasable tube coupling permanently and fluidly connected to the chemical injector, wherein a first end of the releasable tube coupling is removably and fluidly connected to the first end of the first tube; and a metering device attached to the first end of the first tube, wherein the metering device is adapted for controlling a flowrate of liquid chemical into the chemical injector from the chemical supply, wherein the metering device is comprised of a metering tip, and wherein the metering tip is threadably connected to the first end of the first tube.

* * * * *